US006481939B1

(12) United States Patent
Gillespie et al.

(10) Patent No.: US 6,481,939 B1
(45) Date of Patent: Nov. 19, 2002

(54) TOOL TIP CONDUCTIVITY CONTACT SENSOR AND METHOD

(76) Inventors: Robb S. Gillespie, 911 Woodlawn Ave., Ann Arbor, MI (US) 48104; Steven A. Rogacki, 2545 S. Lima Center Rd., Chelsea, MI (US) 48118

( * ) Notice: Subject to any disclaimer, the term of this patent is extended or adjusted under 35 U.S.C. 154(b) by 0 days.

(21) Appl. No.: 09/939,154

(22) Filed: Aug. 24, 2001

(51) Int. Cl.[7] .............................. B23C 3/00; B23Q 17/00
(52) U.S. Cl. ..................... 409/131; 408/1 R; 408/13; 409/136; 409/186; 409/193
(58) Field of Search ................. 409/131, 134, 409/186, 193; 483/1; 318/572, 285; 324/133, 76.11, 207.17; 408/13, 11, 6, 1 R (56) References Cited

U.S. PATENT DOCUMENTS

| | | | |
|---|---|---|---|
| 2,256,120 A | | 9/1941 | Lovenston .................. 177/311 |
| 2,435,514 A | | 2/1948 | Ross .......................... 177/311 |
| 3,476,013 A | | 11/1969 | Zemberry ..................... 409/12 |
| 3,817,647 A | * | 6/1974 | Lemelson ..................... 408/6 |
| 3,871,536 A | * | 3/1975 | Brown ......................... 172/6 |
| 4,203,691 A | * | 5/1980 | Nishimura et al. ........... 408/13 |
| 4,329,771 A | * | 5/1982 | Eto et al. .................... 408/11 |
| 4,396,322 A | * | 8/1983 | Nomura et al. .............. 408/11 |
| 4,428,055 A | * | 1/1984 | Zurbrick et al. ............ 318/572 |
| 4,451,892 A | * | 5/1984 | McMurtry .................... 318/572 |
| 4,638,248 A | * | 1/1987 | Schweikert ................ 324/76.11 |
| 4,650,375 A | * | 3/1987 | Millsap ..................... 318/285 |
| 4,657,451 A | * | 4/1987 | Tanaka .................... 324/207.17 |
| 4,694,686 A | * | 9/1987 | Fildes et al. ................ 324/71.1 |
| 4,736,157 A | * | 4/1988 | Betker et al. ............... 324/133 |
| 4,782,452 A | | 11/1988 | Thomas ...................... 364/550 |

FOREIGN PATENT DOCUMENTS

| | | | | |
|---|---|---|---|---|
| JP | 3-194473 | * | 8/1991 | ..................... 483/1 |
| JP | 10-111143 | * | 10/1998 | ..................... 483/1 |

* cited by examiner

*Primary Examiner*—William Briggs
(74) *Attorney, Agent, or Firm*—Young & Basile, PC (57) ABSTRACT

A tool tip conductivity sensor and method for determining when a tool tip of a machine contacts a workpiece. The sensor has at least two external connectors, one to the workpiece and the other to the machine. When the tool tip grazes the workpiece surface an electrical circuit is completed. The signal from the contacts is supplied to a trigger circuit, which preferably compares the signal to a DC offset. The trigger signal from the trigger circuit is supplied to a notification circuit, which provides a signal indicating contact. Preferably, the notification circuit receives the trigger signal and provides a steady "On" condition for an LED or activates an audible device, such as a piezoelectric transducer. The notification circuit can also provide a reference for further machining to a controller of the machine using the sensor as a contact probe.

29 Claims, 3 Drawing Sheets

TOOL TIP CONDUCTIVITY CONTACT SENSOR AND METHOD

FIELD OF THE INVENTION

The invention relates in general to the detection of the contact of a tool to a workpiece for further machining operations.

DESCRIPTION OF THE RELATED ART

In precision machine operations, the point at which a tool contacts a workpiece must be accurately determined for additional tooling operations. Visual observation is inadequate in many situations because of the size and/or shape of the machine. Feeler gauges are usually not practical when the tool is moving.

Contact sensing systems are known in the prior art that electrically insulate a workpiece from the tool. The tool then completes an electrical circuit when it contacts the workpiece, which often produces a visible or audible effect. These systems are generally satisfactory when used with stationary, single-edge tools maintaining continuous contact with the workpiece, such as a drill. However, rotating multi-edge tools, such as a milling tool, used with such systems can create inaccuracies.

One such contact sensing system is presented in U.S. Pat. No. 3,476,013 to Zemberry. Zemberry teaches a contact sensing apparatus utilizing two transformers with each primary connected in series to a power source. When a tool and a workpiece make contact, the secondary of one transformer short circuits, resulting in an impedance change lighting a lamp connected across the secondary of the other transformer. The use of transformers in the sensing circuit can result in low sensitivity because leakage inductance attenuates the high frequency signal components caused by the short contact time of the tool. The use of AC excitation to detect the contact can also allow substantial contact before the bulb lights. Finally, such a design does not address changes in the conditions in which the sensing system is being used, such as the presence of lubricants, often used in tooling, which form an electrically conductive bridge between the workpiece and the machine base.

SUMMARY OF THE INVENTION

The present invention is a tool tip conductivity sensor and method for detecting the contact of a tool to a workpiece. The method of the present invention comprises the steps of electrically coupling a first lead to one of the workpiece and a holder supporting the workpiece and a table supporting the workpiece and the holder; electrically coupling a second lead to a machine operating the tool at a point electrically insulated from the first lead; generating an input signal whenever a circuit between the first lead and the second lead is closed; and generating an indicator signal responsive to the input signal indicating the contact of the tool to the workpiece.

In one aspect of the invention, the method further comprises the steps of comparing a DC offset to the input signal; generating a trigger signal from the trigger circuit whenever the input signal is greater than the DC offset; and generating the indicator signal in response to the trigger signal. In this aspect, the step of comparing the DC offset to the input signal preferably comprises the steps of supplying the input signal to a first input of a comparator and supplying the DC offset to a second input of the comparator. The trigger signal is the output of the comparator. The step of generating the indicator signal in response to the trigger signal can comprise the steps of supplying the trigger signal to a comparator; connecting a resistor to an input of the comparator; and connecting a capacitor in parallel with the resistor, the capacitor receiving a charge from the trigger signal and dissipating the charge across the resistor when the trigger signal ends. In this aspect, the output of the comparator is the indicator signal. The method can further include the step of generating the DC offset using a power supply supplying power to a resistor network.

In another aspect, the invention further comprises the step of supplying the indicator signal to at least one of an LED, an audible device, and a position signaling circuit supplying a position signal to a controller of the tool. In this aspect, the method can further comprise the steps of electrically coupling the first lead to a contactor of a contact probe; generating a reference position when a contact of the tool to the contactor closes the circuit between the first lead and the second lead; and comparing the position signal to the reference position for further machining operations.

In another aspect of the invention, the input signal is a pulsed trigger signal and the step of generating an indicator signal comprises the steps of supplying the pulsed trigger signal to a comparator; connecting a resistor to an input of the comparator; and connecting a capacitor in parallel with the resistor, the capacitor receiving a charge from the pulsed trigger signal and dissipating the charge across the resistor when the pulsed trigger signal ends. Then, the output of the comparator is the indicator signal. This aspect of the invention can further include the step of supplying the indicator signal to at least one of an LED, an audible device, and a position signaling circuit supplying a position signal to a controller of the tool. As mentioned previously, in this aspect, the method can further comprise the steps of electrically coupling the first lead to a contactor of a contact probe; generating a reference position when a contact of the tool to the contactor closes the circuit between the first lead and the second lead; and comparing the position signal to the reference position for further machining operations.

In a preferred aspect of the invention, the method further comprises the steps of supplying the indicator signal to a first oscillator adapted to received the indicator signal and supplying an activation signal from the first oscillator to a piezoelectric acoustic transducer. This aspect can further comprises the steps of supplying the indicator signal to a second oscillator, the second oscillator supplying an output to the first oscillator, and periodically preventing resonance of the piezoelectric acoustic transducer using the output of the second oscillator.

The apparatus of the present invention for detecting a contact of a tool to a workpiece comprises means for electrically coupling a first lead to one of the workpiece and a holder supporting the workpiece and a table supporting the workpiece and the holder; means for electrically coupling a second lead to a machine operating the tool at a point electrically insulated from the first lead; means for generating an input signal whenever a circuit between the first lead and the second lead is closed; and means for generating an indicator signal responsive to the input signal indicating the contact of the tool to the workpiece.

Preferably, the apparatus includes at least one of an LED, an audible device, and a position signaling circuit supplying a position signal to a controller of the tool. In this aspect, the apparatus can further comprise a contact probe including a contactor adapted to be electrically coupled to the first lead and carrying an electrical contact wherein a contact of the tool to the contactor closes the circuit between the first lead and the second lead to generate a reference position; and means for comparing the position signal to the reference position for further machining operations. In the aspect with an audible device, the device is preferably a piezoelectric acoustic transducer.

In one aspect of the invention, the means for generating an input signal whenever a circuit between the first lead and the second lead is closed comprises a trigger circuit comparing a DC offset to the input signal and generating a trigger signal whenever the input signal is greater than the DC offset. In this aspect, a power supply can supply power to a resistor network, which provides the DC offset. The trigger circuit can be a comparator wherein the input signal is supplied to a first input of the comparator and the DC offset is supplied to a second input of the comparator. Also in this aspect, the trigger signal can be supplied to a pulse stretching circuit, where the pulse stretching circuit includes a comparator adapted to receive the trigger signal; a resistor connected to an input of the comparator; and a capacitor connected in parallel with the resistor, the capacitor receiving a charge from the trigger signal and dissipating the charge across the resistor when the trigger signal ends. The output of the comparator is the indicator signal.

In another aspect of the invention, the apparatus further comprises a first oscillator adapted to receive the indicator signal and a piezoelectric acoustic transducer receiving an activation signal from the first oscillator. In this aspect, the apparatus can further include a second oscillator receiving the indicator signal and supplying an output to the first oscillator, wherein the output of the second oscillator periodically prevents resonance of the piezoelectric acoustic transducer.

In yet another aspect of the invention, the input signal is a pulsed trigger signal and the means for generating an indicator signal comprises a pulse stretching circuit includes a comparator adapted to receive the trigger signal; a resistor connected to an input of the comparator; and a capacitor connected in parallel with the resistor, the capacitor receiving a charge from the trigger signal and dissipating the charge across the resistor when the trigger signal ends. The output of the comparator is the indicator signal. This aspect has a number of variations. For example, the apparatus can further include at least one of an LED, an audible device, and a position signaling circuit supplying a position signal to a controller of the tool. In the aspect including an audible device, preferably the audible device is a piezoelectric acoustic transducer. Where a position signal is supplied, the apparatus further comprises a contact probe including a contactor electrically coupled to the first lead and carrying an electrical contact wherein a contact of the tool to the contactor closes the circuit between the first lead and the second lead to generate a reference position and means for comparing the position signal to the reference position for further machining operations. In another variation, the apparatus further comprises a first oscillator adapted to receive the indicator signal and a piezoelectric acoustic transducer receiving an activation signal from the first oscillator. In this aspect, a second oscillator receiving the indicator signal and supplying an output to the first oscillator can be included, where the output of the second oscillator periodically prevents resonance of the piezoelectric acoustic transducer.

Thus, the present invention is a highly sensitive and accurate tool tip conductivity sensor. It can accurately detect contacts under a variety of conditions. Since the sensor produces a signal upon each contact of the tool to a workpiece, the sensor can also be used to indicate tool position and to monitor for breakage of the tool.

BRIEF DESCRIPTION OF THE DRAWING

The description herein makes reference to the accompanying drawing wherein like reference numerals refer to like parts throughout the several views, and wherein.

DETAILED DESCRIPTION

The apparatus of the present invention is a sensor particularly designed to detect the momentary electrical connection between the tip of a rotating tool mounted in a machine, such as a mill, and the workpiece. The tool moves slowly towards the workpiece until contact is detected, thus establishing a position reference for additional machining operations. Although the sensor is particularly designed to detect this contact by a rotating tool, the apparatus can detect the contact of any tool.

Figure 1:
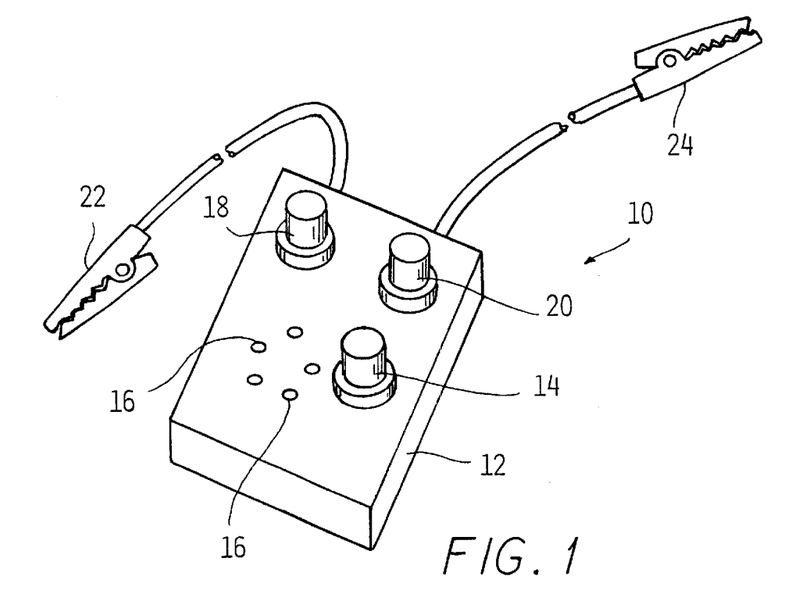
FIG. 1 is a perspective view of one aspect of the apparatus of the present invention.
Figure 2:
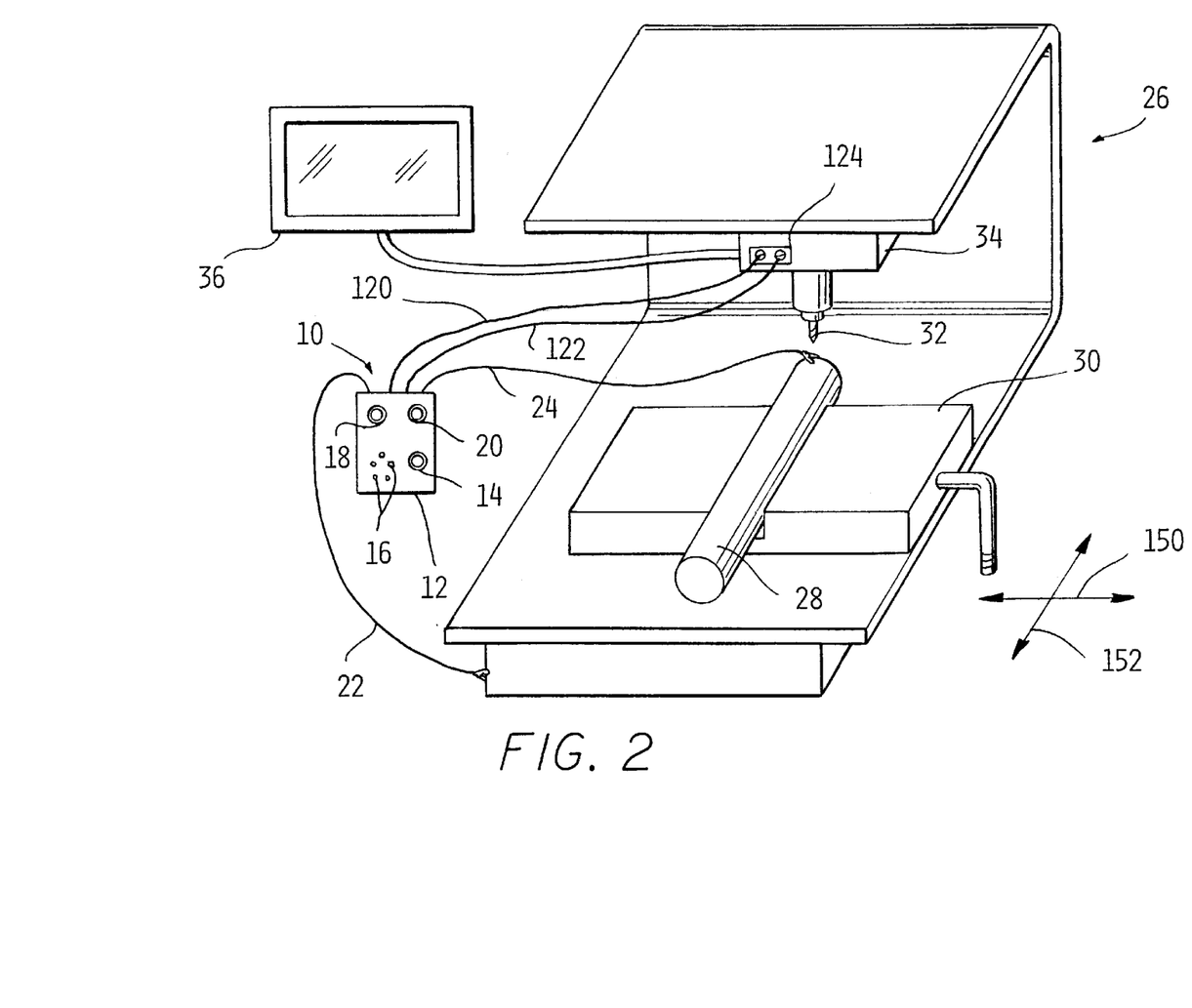
FIG. 2 is a pictorial representation of another aspect of the present invention used with one type of precision machine.

As shown in FIG. 1, the sensor 10 is contained in a small housing 12. On the face of the housing 12 is an light-emitting diode (LED) 14 and apertures 16 allowing an audible tone to be heard outside of the housing 12. An on/off power switch 18 is mounted in the face of the housing 12, along with an optional volume switch 20, which controls the volume of the audible tone. Two leads or connectors 22, 24 extend from the housing 12. Turning now also to FIG. 2, one connector 22 is attached to a fixed point on the machine, milling machine 26 for example, while the other connector 24 is connected to the workpiece 28. Alternatively, connector 24 can be connected to a vise 30. The connectors 22, 24 can be any conventional means for electrically coupling or connecting inputs to a circuit to two points on the machine 26 and the workpiece 28. The connectors 22, 24 shown in FIG. 1 are wires attached to the alligator clips. The wires extend through the housing 12 and connect to a board (not shown) within the housing 12. The connectors 22, 24 can also be in the form of a cable capable of mounting to a socket (not shown) mounted in the housing 12. The other end of the cable would be in the form of two leads.

The workpiece 28 is supported in the milling machine 26 by a vise 30, and the workpiece 28 and vise 30 are electrically insulated from the rest of the milling machine 26 by standard means. For example, the vise 30 can be mounted on a metal plate or table, which is isolated from remainder of machine 26 by means of an electrically insulative plate (not shown). The milling tool 32 is operated by a controller 34 including a motor supplied by a power source (not shown). The controller 34 controls the movement of the tool 32 over the workpiece 28 and can include a connection to a display 36, which displays information such as tool position. Preferably, connectors 120 and 122 extend from the housing 12 and provide a signal from the sensor 10 directly to the controller 34, possibly through a two-screw terminal 124.

Figure 3:
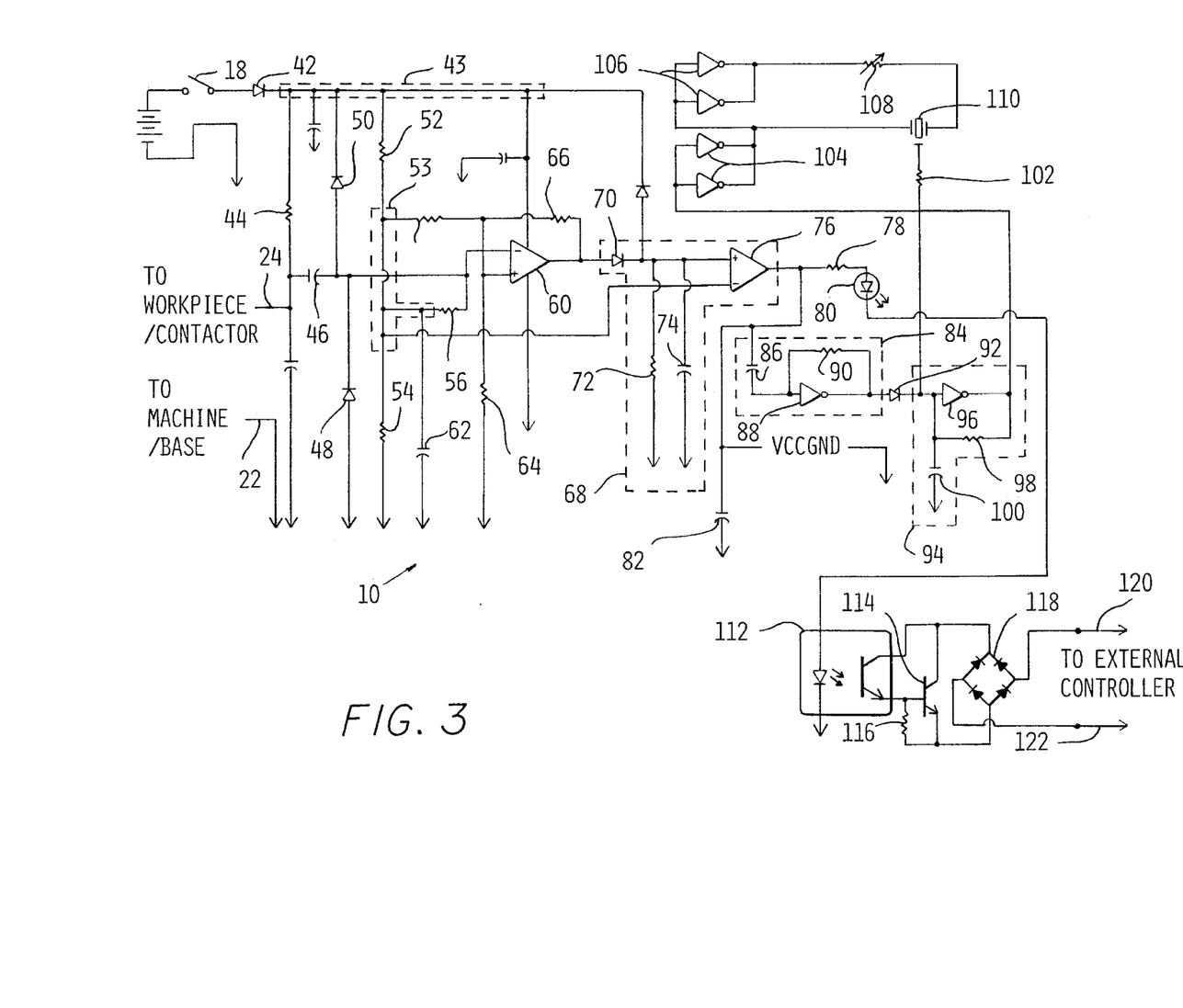
FIG. 3 is a circuit diagram of the aspect of the invention shown in FIG. 2.

As shown in FIG. 3, the sensor 10 is preferably supplied with a nine-volt battery 40. However, any other source of direct current (DC) power is possible, including a rectified alternating current (AC) power source. The power switch 18 is connected to the battery 40, saving power when the switch 18 is open. When the switch 18 is closed, power is supplied to the remainder of the components shown in FIG. 3.

The negative terminal of the battery 40 is grounded. The positive terminal of the battery 40 is connected to the anode of an input diode 42 through the switch 18. The cathode of the input diode 42 is connected to first common node 43 where a biasing resistor 44 is connected. The other end of the biasing resistor 44 is connected to ground through a grounding capacitor. The connector 24 to the workpiece 28 is attached to a node between the biasing resistor 44 and the grounding capacitor, while the connector 22 to the milling machine 26 is grounded. All of the capacitors in the sensor 10 are preferably Mylar capacitors.

A blocking capacitor 46, like the connector 24, is attached to a node between the biasing resistor 34 and the grounding capacitor. The blocking capacitor 46 blocks DC signals and AC couples the signal from the connector 24 to the inverting input of a trigger comparator 60. Prior to its connection to the inverting input of the trigger comparator 60, the blocking capacitor 46 is connected to two diodes 48, 50. The cathode of one diode 48 is attached to the blocking capacitor 46, while the anode is grounded. The second diode 50 is coupled between the blocking capacitor 46 and the first common node 43. The blocking capacitor 46 is also, at the node where the two diodes 48, 50 meet, connected to a resistor network.

The resistor network including resistors 52, 54, 56 and 58 biases the inputs to the trigger comparator 60, to be discussed hereinafter, so that the inverting input is slightly more positive than the non-inverting input. This low output to the trigger comparator 60 provides a small DC offset as the trigger threshold. Specifically, one end of the first network resistor 52 is connected to the first common node 43 where the cathode of the input diode 42, the cathode of the second diode 50 and the biasing resistor 44 are connected. This first common node 43 is also connected to ground through a grounding capacitor. The other end of the first network resistor 52 is connected a second common node 53. At the second common node 53, the second network resistor 54 and a capacitor 62 are connected in parallel to ground.

One end of the third network resistor 56 is connected to the second common node 53. The blocking capacitor 46 is connected to the resistor network through the third network resistor 56. This node between the blocking capacitor 46, the two diodes 48, 50 previously discussed and the third network resistor 56 is connected to the inverting input of the trigger comparator 60.

The fourth network resistor 58 is also connected at one end to the second common node 53. The other end of the fourth network resistor 58 is connected to the non-inverting input of the trigger comparator 60, which is grounded through a resistor 64. Feedback is achieved by a feedback resistor 66 connected to the node where fourth network resistor 58 and the resistor 64 are connected to the non-inverting input of the trigger comparator 60. The feedback resistor 66 provides hysterisis, adding a small amount of positive feedback to the trigger comparator 60 that helps produce a cleaner switching action. The trigger comparator 60 is supplied by a connection to the first common node 43 through a connection to a grounded capacitor. The trigger comparator 60 is also grounded. One suitable trigger comparator 60 is TLC393 by Texas Instruments Incorporated of Dallas, Tex.

The output of the trigger comparator 60 provides a trigger signal indicating the contact of the tool 32 to the workpiece 28. Depending upon the tool used, this output can be a pulsed signal or a continuous signal. The trigger signal, in either case, is supplied to a notification circuit producing an indicator signal indicating the contact. For example, the notification circuit could be a simple filter, smoothing out the signal before providing the indicator signal to a visible or audible device or to the controller 34. Preferably, though, the notification circuit is a pulse stretching circuit 68.

The output of the pulse stretching circuit 68 is in the form of a steady "on" condition for the LED 80, to be discussed hereinafter. The pulse stretching circuit 68 includes a diode 70, a draining resistor 72, a charging capacitor 74, and a comparator 76. The anode of the diode 70 is connected to the output of the trigger comparator 60. The cathode of the diode 70 is connected to the non-inverting input of the comparator 76. The cathode of diode 70 is also connected to the anode of another diode with its cathode connected to the first common node 43. Finally, the cathode of the diode 70 is connected at the same node to the draining resistor 72 and the charging capacitor 74, which are in parallel to ground. The inverting input of the comparator 76 is connected to the second common node 53. A suitable comparator 76 is TLC393 by Texas Instruments Incorporated of Dallas, Tex.

The output of the comparator 76 is connected through a resistor 78 to the anode of an LED 80 whose cathode is, in one aspect of the invention, grounded. In the aspect shown, the cathode of the LED 80 is connected to a circuit providing a signal to the controller 34, which circuit will be discussed hereinafter. The output of the comparator 76 is also connected to ground through a bypass capacitor 82 and is also connected to an optional auxiliary oscillator 84. Alternatively, the output of the comparator 76 can be connected directly to a startup oscillator 94 through a diode 92, to be discussed hereinafter. The auxiliary oscillator 84 includes a capacitor 86 input into an inverting buffer 88. Feedback is supplied through a resistor 90.

The auxiliary oscillator 84 is connected to a startup oscillator 94 through a diode 92. Specifically, the output of the inverting buffer 88 is connected to the anode of the diode 92. The cathode of the diode 92 is connected to the startup oscillator 94 and a feedback resistor 102 connected to an audible sound generator such as a piezoelectric acoustic transducer 110, to be discussed hereinafter. The startup oscillator 94 includes an inverting buffer 96, a resistor 98 and a capacitor 100. The cathode of the diode 92 is connected to the input of the inverting buffer 96, and feedback is supplied by the resistor 98. The end of the resistor 98 connected to the input of the inverting buffer 96 is connected to the capacitor 100, which is grounded on its other end.

Due to the feedback, the output of the inverting buffer 96 is a pulsed activation signal at a time constant created by the resistor 98 and the capacitor 100. The output of the inverting buffer 96 is inverted through two parallel inverting buffers 104. The inverted signal is supplied to one input of the piezoelectric acoustic transducer 110 and to two additional inverting buffers 106. The signal from the additional inverting buffers 106 is connected to the other input of the piezoelectric acoustic transducer 110 through a resistor 108. Although the resistor 108 is shown as an adjustable resistor controlled by switch 20 that adjusts the audio volume of the piezoelectric acoustic transducer 110, the resistor can have a fixed resistance. As mentioned previously, feedback from the piezoelectric acoustic transducer 110 is supplied through a feedback resistor 102 connected to the input of the startup oscillator 94.

A preferred aspect of the invention includes the ability to provide a position signal to the controller 34 indicating the contact of the tool 32 to a workpiece 30. One circuit to perform this function of position signaling is also shown in FIG. 3. Here, the LED 80 is connected to an optocoupler 112 to isolate the electronics of the sensor 10 from the controller 34. The optocoupler 112 preferably includes an LED in series with the LED 80 and a field-effect transistor (FET) coupled to the LED. The emitter of the optocoupler FET is tied to the base of an FET 114 whose emitter is tied to one input of a full-wave bridge rectifier 118. A resistor 116 is connected from the base of the FET 114 to the emitter of the FET 114. The collector of the optocoupler FET and the collector of the FET 114 are tied to the other input of the bridge rectifier 118. The outputs of the bridge rectifier 118 are connected to two leads or connectors 120, 122 extending from a board (not shown) within the housing 12 to the controller 34. As shown in FIG. 2, the connectors 120, 122 are wires electrically coupled, or connected, to the controller 34 through a two-screw terminal 124 mounted on the controller 34. Alternatively, each of the connectors 120, 122 can end in an alligator clip, or some other retainer clip. The connectors 120, 122 can also be in the form of a cable capable of mounting to a socket (not shown) mounted in the housing 12. The other end of the cable would be in the form of two leads as shown.

The operation of the sensor 10 begins when the switch 18 is closed. When the switch 18 closes, power is supplied to the circuit. In this quiescent state, prior to contact of the tool 32 with a workpiece 28, the comparator 60 is not signaling. Due to its low power consumption, the sensor 10 will operate for several months on one battery 40 in this quiescent state.

As mentioned, the resistor network of resistors 52, 54, 56 and 58 biases the inputs to the trigger comparator 60 so that the inverting input is slightly more positive than the non-inverting input. This provides a small DC offset as the trigger threshold. When the switch 18 is closed, a DC bias quickly establishes itself at the workpiece. Contact between the tool 32 and the workpiece 28 completes the circuit between the connector 22 and the connector 24, supplying a signal to the trigger comparator 60 through the capacitor 46, which blocks any DC component of the input. This tool tip contact produces a negative pulse that pulls the voltage at the inverting input of the trigger comparator 60 in the negative direction. In some cases, this negative pulse can be a very short pulse. When the voltage at the inverting input falls below the voltage on the non-inverting input, the trigger comparator 60 output goes high. When the contact is ended, the pulse ends. Since the trigger comparator 60 has a trigger threshold near the bias setting, it is sensitive and reacts to small signals. This allows the operator to take immediate action upon the contact of the tool 32 to the workpiece 28.

The output of the trigger comparator 60 is preferably connected to the pulse stretching circuit 68. As previously described, the trigger signal from the trigger comparator 60 can be a string of momentary pulses corresponding to the contacts of the tool 32 to the workpiece 28. The pulse stretching circuit 68 receives this pulsed signal from the trigger comparator 60 and ensures a noticeable output from even a single contact pulse. Specifically, a high output from the trigger comparator 60 forward biases the diode 70 of the pulse stretching circuit 68 and charges charging capacitor 74 with a high voltage level. When the input signal from the trigger comparator 60 goes away, reverse-bias of the diode 70 causes the charge accumulated on charging capacitor 74 to drain through draining resistor 72. During this period of voltage drain, the voltage on the non-inverting input of comparator 76 is higher than the voltage on the inverting input. Therefore, the output of the comparator 76 is high, activating LED 80 and the signal to the controller 34 from the connectors 120, 122. A series of short pulses at the tool tip are thereby translated into the LED 80 glowing continuously until the charge in the charging capacitor 74 dissipates because no additional input signal is received through the diode 70. Of course, this pulse stretching circuit 68 can also operate with a continuous trigger signal received from the trigger comparator 60.

An audible tone is also preferably produced upon contact of the tool 32 with the workpiece 28. Specifically, the output of the pulse stretching circuit 68, an indicator signal, also drives the piezoelectric acoustic transducer 110, which produces the audible tone. The startup oscillator 94 produces a pulsed activation signal due to the feedback and time constant created by resistor 98 and capacitor 100. This signal is inverted by buffers 104 and again by buffers 106. The opposing signals are applied to the inputs of the piezoelectric acoustic transducer 110. Part of the signal is fed back through the feedback resistor 102 to the startup oscillator 94, closing the loop. The piezoelectric acoustic transducer 110 begins to ring at its self-resonant frequency, producing an audible tone. The startup oscillator 94 no longer functions once the piezoelectric acoustic transducer 110 is at resonance because the piezoelectric oscillation is at a much higher frequency.

A machine shop provides a potentially noisy background to an audible tone produced by the piezoelectric acoustic transducer 110. Therefore, an auxiliary oscillator 84 can be incorporated to modulate the audible tone in an effort to distinguish the audible tone from background noise. The auxiliary oscillator 84, like the startup oscillator 94, also begins to produce an oscillating signal, preferably at a low frequency. Using example values for the capacitor 86 and the resistor 90 of 0.1 micro-farads and 4.7 mega-ohms, respectively, the frequency of oscillation of the auxiliary oscillator is about one to two Hertz. When the output of the auxiliary oscillator 84 is high, the input to startup oscillator 94 is also high, preventing the piezoelectric acoustic transducer 110 from oscillating. When the output from the auxiliary oscillator 84 goes low, the piezoelectric acoustic transducer 110 can start up again. Thus, the piezoelectric acoustic transducer 110 produces a series of beeps when a tool 32 contacts a workpiece 28. To assure that the piezoelectric acoustic transducer 110 produces an audible tone immediately upon contact, the capacitor 86 of the auxiliary oscillator 84 is tied to the output of the pulse stretching circuit 68. When the signal from the pulse stretching circuit 68 goes high, indicating contact, the output of the auxiliary oscillator 84 starts low.

The optional connectors 120, 122 from the output of the pulse stretching circuit 68 to the controller 34 provide a signal to the controller 34 to indicate when the tool 32 contacts the workpiece 28. Given a known initial position of the tool 32, this signal can be used in the controller 34 to calculate the position of the tool 32 in three-dimensional space at the time of its contact with the workpiece 28. Such position can be displayed on the display 36 or be used to determine the next position of the tool 32. This signal can also be used to determine whether there has been tool breakage during the use of the tool 32, for example, by measuring the amount of time that passes while the pulse stretching circuit 68 sends the signal. If less than a predetermined amount of time based on the machine cycle time passes before the signal ends, the tool 32 is assumed to be broken, and corrective action such as shutting down the machine 26 or producing an alarm can be taken.

As mentioned, given a known initial position of the tool 32, the signal from the pulse stretching circuit 68 to the controller 34 through the connectors 120, 122 can be used in the controller 34 to calculate the position of the tool 32 in three-dimensional space at the time of its contact with the workpiece 28. One use of this position is to determine the next position of the tool 32 during tooling operations. The known initial position is a three-dimensional reference (X, Y, Z) generally input into the machine controller 34 prior to the start of tooling operations on the workpiece 28. The initial X and Y usually result from an arbitrary starting point for the center of the tool tip 32, and are along the X-axis 150 and Y-axis 152, respectively, shown in FIG. 2.

However, the initial value for Z (the "initial Z") must be input for each individual tool tip 32 used in the machine and controlled by the controller 34. In addition to the length of the varying tool tips that may be used in the machine, adjustments must be made for the length of the spindle that holds the tool tip 32, which can be machine specific. In the prior art, a separate contact machine or separate calibration machine is used to determine an initial Z for each tool tip 32 in comparison to the initial Z for one specified tool tip (the "reference Z").

Figure 4:
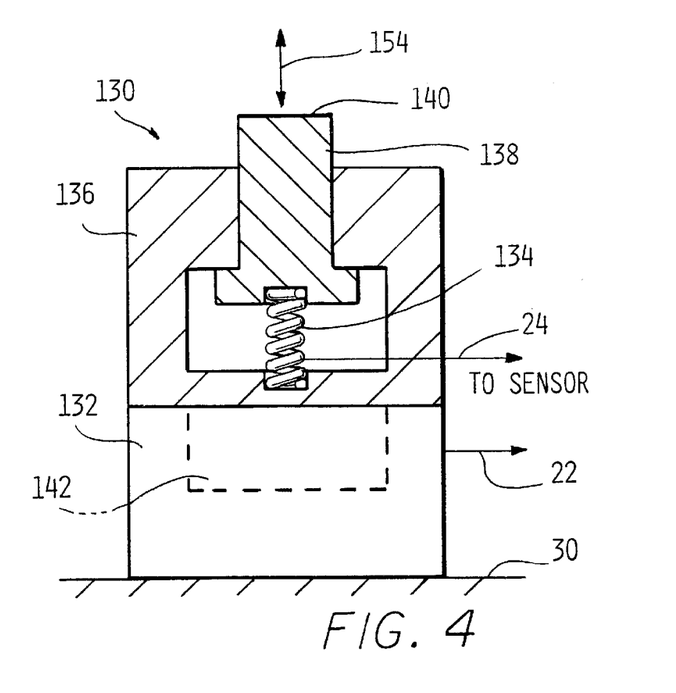
FIG. 4 is a pictorial representation of a contact probe for use with the present invention.

The present invention allows a machine to which a tool tip 32 is attached, such as machine 26 in FIG. 2, to determine its reference Z and the offset of each tool tip 32 from that reference Z. One way in which the sensor 10 can do this is to be used as a contact probe 130 as shown in FIG. 4. The contact probe 130 comprises a magnetic, conductive base 132 resting on, and thus electrically coupled to, the machine 26 table directly or on the vise 30 as shown. One connector 22 to the sensor 10 is electrically coupled to the conductive base 132. The other connector 24 of the sensor 10 is coupled to an overshoot spring 134 mounted within a cavity formed in a body 136 of an insulating material such as plastic or rubber. Alternatively, the insulating material of the body 136 can be replaced with a conductive material with an insulating layer between it and the conductive base 132.

The body 136 includes an aperture in which a plunger 138 is inserted and mounted or coupled to the free end of the overshoot spring 134 such that pressure along the downward Z-axis 154 results in the plunger 138 compressing the overshoot spring 134, and release of the pressure in the opposed direction decompresses the overshoot spring 134. The surface 140 of the plunger 138 is a conductive contact surface, and the entire plunger 138 is preferably conductive. Optionally, an electronics cavity 142 is located within the base 132, and the sensor 10 is housed within the cavity 142. In that embodiment, the connectors 120 and 122 to the controller 34 emerge through the base 132 to the controller 34. It should be noted that the overshoot spring 134, although desirable, is not necessary. The plunger 138 can be a unitary contactor body extending to the floor of the cavity of the body 136. However, the presence of the overshoot spring 134 reduces risk of breaking a tool tip 32 upon contact with the surface 140.

In operation, the contact probe 130 determines the reference Z coordinate and the initial Z values, or offsets, for individual tool tips 32. Specifically, each tool tip 32 is placed in turn in the spindle of the machine 26 and lowered until contact with the surface 140 of the plunger 138 occurs. The contact with the surface 140 forms a conductive path through the plunger 138 and the overshoot spring 134, closing the circuit between the connectors 22 and 24 of the sensor. The length of each tool tip 32 is preferably supplied directly to the controller 34 through the connectors 120 and 122. One tool tip 32 is chosen as the reference Z, and the initial Z, which is the offset for each tool tip 32, is calculated against the reference Z. In this manner, the sensor 10 can provide the initial Z values for various tool tips 32 used in the machine 26. These values can be used in the controller 34 to determine to what depth the tool tip 32 should extend into the workpiece 28. Also, upon contact of the tool tip 32 to the workpiece 28, the signal provided to the controller 34 from the connectors 120, 122 can be used to determine further machining operations.

It should be noted that although the preferred aspect includes a contactor, i.e, the plunger 138 with its surface 140 and the overshoot spring 134, mounted within the body 136 and mounted on the base 132, the base 132 is not necessary. The body 136 and contactor can be supported directly on the machine 26 or vise 30. In this case, the connector 22 is connected directly to the machine 26 or vise 30, instead of to the base 132.

The sensor 10 functions well when used in a variety of environments and different conditions. For example, since cutting lubricants are typically slightly conductive, and metal shavings are conductive, each can form an electrical bridge between the workpiece and the machine base, tending to circumvent the operation of many conductive sensors. However, the sensor 10 avoids using a fixed threshold to which the conductivity is compared. The sensor 10, through its AC coupling, measures the change in voltage to detect the contact between the tool 32 and the workpiece 28. Thus, the sensor 10 reduces the effects of cutting lubricants or metal shavings over conventional designs. Further, this feature eliminates the need to calibrate the thresholds when the sensor 10 is used on a variety of machines.

Thus, a tool tip conductivity sensor 10 is presented that is highly sensitive and accurate for use in a variety of environments and provides various means to identify the contact of a tool 32 to a workpiece 28.

What is claimed is:

1. An apparatus for detecting a contact of a tool to a workpiece, comprising:

means for electrically coupling a first lead to one of the workpiece and a holder and a table, the holder supporting the workpiece, the table supporting the workpiece and the holder;

means for electrically coupling a second lead to a machine at a point electrically insulated from the first lead, the machine operating the tool;

means for generating a signal whenever a circuit between the first lead and the second lead is closed;

a first oscillator adapted to receive the signal;

a piezoelectric acoustic transducer receiving an activation signal from the first oscillator, and a second oscillator adapted to receive the signal and supply an output to the first oscillator; and wherein the output of the second oscillator periodically prevents resonance of the piezoelectric acoustic transducer.

2. A method for detecting a contact of a tool to a workpiece, comprising the steps of:

electrically coupling a first lead to one of the workpiece and a holder and a table, the holder removable supporting the workpiece, the table supporting the holder;

electrically coupling a second lead to a machine at a point electrically insulated from the first lead, the machine operating the tool;

generating an input signal whenever a circuit between the first lead and the second lead is closed;

comparing a DC offset to the input signal;

generating a trigger signal from the trigger circuit whenever the input signal is greater than the DC offset; and generating an indicator signal in response to the trigger signal, the indicator signal indicating the contact of the tool to the workpiece.

3. The method of claim 2 wherein the step of comparing the DC offset to the input signal comprises the steps of:

supplying the input signal to a first input of a comparator; and supplying the DC offset to a second input of the comparator, and wherein the trigger signal is the output of the comparator.

4. The method of claim 2 wherein the step of generating the indicator signal in response to the trigger signal comprises the steps of:

supplying the trigger signal to a comparator;

connecting a resistor to an input of the comparator; and connecting a capacitor in parallel with the resistor, the capacitor receiving a charge from the trigger signal and dissipating the charge across the resistor when the trigger signal ends, and wherein the output of the comparator is the indicator signal.

5. The method of claim 2, further comprising the step of:

generating the DC offset using a power supply supplying power to a resistor network.

6. The method of claim 2, further comprising the step of:

supplying the indicator signal to at least one of an LED, an audible device, and a position signaling circuit supplying a position signal to a controller of the tool.

7. The method of claim 6, further comprising the steps of:

electrically coupling the first lead to a contactor of a contact probe, the contact probe separate from the workpiece and removably securable to one of the table and the holder;

electrically coupling the second lead to one of the table and the holder, the contact probe electrically insulating the contactor from the one of the table and the holder;

generating a reference position when a contact of the tool to the contactor closes the circuit between the first lead and the second lead; and comparing the position signal to the reference position for machining operations on the workpiece.

8. A method for detecting a contact of a tool to a workpiece, comprising the steps of:

electrically coupling a first lead to one of the workpiece and a holder and a table, the holder removably supporting the workpiece, the table supporting the holder;

electrically coupling a second lead to a machine at a point electrically insulated from the first lead, the machine operating the tool;

generating an input signal whenever a circuit between the first lead and the second lead is closed wherein the input signal is a pulsed trigger signal; and generating an indicator signal responsive to the input signal indicating the contact of the tool to the workpiece, the generating step including the steps of:

supplying the pulsed trigger signal to a comparator;

connecting a resistor to an input of the comparator; and connecting a capacitor in parallel with the resistor, the capacitor receiving a charge from the pulsed trigger signal and dissipating the charge across the resistor when the pulsed trigger signal ends, and wherein the output of the comparator is the indicator signal.

9. The method of claim 8, further comprising the step of:

supplying the indicator signal to at least one of an LED, an audible device, and a position signaling circuit supplying a position signal to a controller of the tool.

10. The method of claim 9, further comprising the steps of:

electrically coupling the first lead to a contactor of a contact probe;

generating a reference position when a contact of the tool to the contactor closes the circuit between the first lead and the second lead; and comparing the position signal to the reference position for further machining operations.

11. The method of claim 6, further comprising the steps of:

supplying the indicator signal to a first oscillator adapted to received the indicator signal; and supplying an activation signal from the first oscillator to a piezoelectric acoustic transducer.

12. A method for detecting a contact of a tool to a workpiece, comprising the steps of:

electrically coupling a fast lead to one of the workpiece and a holder and a table, the holder removable supporting the workpiece, the table supporting the holder;

electrically coupling a second lead to a machine at a point electrically insulated from the first lead, the machine operating the tool;

generating a signal indicating the contact of the tool to the workpiece whenever a circuit between the first lead and the second lead is closed;

supplying the signal to a first oscillator adapted to received the signal;

supplying an activation signal from the first oscillator to a piezoelectric acoustic transducer;

supplying the signal to a second oscillator, the second oscillator supplying an output to the first oscillator; and periodically preventing resonance of the piezoelectric acoustic transducer using the output of the second oscillator.

13. The apparatus of claim 1 wherein the means for generating a signal whenever a circuit between the first lead and the second lead is closed comprises a trigger circuit comparing a DC offset to the signal and generating a trigger signal whenever the signal is greater than the DC offset.

14. An apparatus for detecting a contact of a tool to a workpiece, comprising:

means for electrically coupling a first lead to one of the workpiece and a holder and a table; the holder removably supporting the workpiece, the table supporting the holder;

means for electrically coupling a second lead to a machine at a point electrically insulated from first lead, the machine operating the tool;

means for generating an input signal whenever a circuit between the first lead and the second lead is closed; and means for generating an indicator signal responsive to the input signal indicating the contact of the tool to the workpiece, the means operable to produce a constant indicator signal when the input signal is a pulsed trigger signal resulting from periodic contact of an edge of the tool with the workpiece.

15. The apparatus of claim 14, further comprising at least one of an LED, an audible device, and a position signaling circuit supplying a position signal to a controller of the tool.

16. The apparatus of claim 15 wherein the audible device is a piezoelectric acoustic transducer.

17. The apparatus of claim 15, further comprising:
a contact probe including a contactor adapted to be electrically coupled to the first lead and carrying an electrical contact wherein a contact of the tool to the contactor closes the circuit between the first lead and the second lead to generate a reference position, to the contact probe removably securable to one of the table and the holder and separate from the workpiece;
the second lead electrically coupled to one of the table and the holder, the contact probe electrically insulating the contactor from the one of the table and the holder; and
means for comparing the position signal to the reference position for machining operations on the workpiece.

18. An apparatus for detecting a contact of a tool to a workpiece, comprising:
means for electrically coupling a first lead to one of the workpiece and a holder and a table, the holder supporting the workpiece, the table supporting the workpiece and the holder;
means for electrically coupling a second lead to a machine at a point electrically insulated from the first lead, the machine operating the tool;
means for generating an input signal whenever a circuit between the first lead and the second lead is closed, the generating means including a trigger circuit comparing a DC offset to the input signal and generating a trigger signal whenever the input signal is greater than the DC offset; and
means for generating an indicator signal responsive to the input signal indicating the contact of tool to the workpiece.

19. The apparatus of claim 18, further comprising a power supply supplying power to a resistor network, which resistor network provides the DC offset.

20. The apparatus of claim 18 wherein the trigger signal is supplied to a pulse stretching circuit, including:
a comparator adapted to receive the trigger signal;
a resistor connected to an input of the comparator; and
a capacitor connected in parallel with the resistor, the capacitor receiving a charge from the trigger signal and dissipating the charge across the resistor when the trigger signal ends, and wherein the output of the comparator is the indicator signal.

21. The apparatus of claim 18 wherein the trigger circuit comprises a comparator; and wherein the input signal is supplied to a first input of the comparator and the DC offset is supplied to a second input of the comparator.

22. The apparatus of claim 18, further comprising:
a first oscillator adapted to receive the indicator signal; and
a piezoelectric acoustic transducer receiving an activation signal from the first oscillator.

23. The apparatus of claim 18, further comprising
a position signaling circuit supplying a position signal to a controller of the tool;
a removable contact probe including a contactor adapted to be electrically coupled to the first lead and carrying an electrical contact wherein a contact of the tool to the contactor closes the circuit between the first lead and the second lead to generate a reference position, the contact probe removably securable to one of the table and the holder and separate from the workpiece;
the second lead electrically coupled to one of the table and the holder, the contact probe electrically insulating the contactor from the one of the table and the holder; and
means for comparing the position signal to the reference position for machining operations on the workpiece.

24. The apparatus of claim 14 wherein the input signal is the pulsed trigger signal wherein the means for generating an indicator signal comprises a pulse stretching circuit, including:
a comparator adapted to receive the trigger signal;
a resistor connected to an input of the comparator; and
a capacitor connected in parallel with the resistor, the capacitor receiving a charge from the trigger signal and dissipating the charge across the resistor when the rigger signal ends, and wherein the output of the comparator is the indicator signal.

25. The apparatus of claim 24 further comprising at least one of an LED, an audible device, and a position signaling circuit supplying a position signal to a controller of the tool.

26. The apparatus of claim 25 wherein the audible device is a piezoelectric acoustic transducer.

27. The apparatus of claim 25, further comprising:
a contact probe including a contactor electrically coupled to the first lead and carrying an electrical contact wherein a contact of the tool to the contactor closes the circuit between the first lead and the second lead to generate a reference position; and
means for comparing the position signal to the reference position for further machining operations.

28. The apparatus of claim 24, further comprising:
a first oscillator adapted to receive the indicator signal; and
a piezoelectric acoustic transducer receiving an activation signal from the first oscillator.

29. The apparatus of claim 28, further comprising:
a second oscillator receiving the indicator signal and supplying an output to the first oscillator, and wherein the output of the second oscillator periodically prevents resonance of the piezoelectric acoustic transducer.

* * * * *